United States Patent

Headley et al.

[11] Patent Number: 5,516,144
[45] Date of Patent: May 14, 1996

[54] SIDE IMPACT AIR BAG INFLATOR

[75] Inventors: Paul S. Headley, Mesa; Lindsay S. Cisney; Todd R. Bailey, both of Higley; Daniel R. Hake, Scottsdale; Tom Amherdt, Gilbert, all of Ariz.

[73] Assignee: TRW Inc., Lyndhurst, Ohio

[21] Appl. No.: 382,422

[22] Filed: Feb. 2, 1995

[51] Int. Cl.⁶ .......................... B60R 21/22; B60R 21/26
[52] U.S. Cl. ............ 280/730.2; 280/737; 280/740; 222/3; 55/525
[58] Field of Search ............ 280/730.2, 737, 280/740, 736, 741, 742, 730.1; 222/3; 55/523, 525

[56] References Cited

U.S. PATENT DOCUMENTS

| | | | |
|---|---|---|---|
| 3,843,151 | 10/1974 | Lewis | 280/736 |
| 3,853,332 | 12/1974 | Lynch | 280/740 |
| 4,981,534 | 1/1991 | Scheffe | 280/741 |
| 5,031,932 | 7/1991 | Frantom et al. | 280/737 |
| 5,078,422 | 1/1992 | Hamilton et al. | 280/737 |
| 5,230,531 | 7/1993 | Hamilton et al. | 280/737 |
| 5,316,336 | 5/1994 | Taguchi et al. | 280/730.2 |
| 5,378,015 | 1/1995 | Rink et al. | 280/736 |

FOREIGN PATENT DOCUMENTS

94/26563  11/1994  WIPO ........................... 280/736

OTHER PUBLICATIONS

Brochure entitled "Dynapore Gas Filtration Media," Michigan Dynamics, Inc., Garden City, Michagan.

*Primary Examiner*—Margaret A. Focarino
*Assistant Examiner*—Peter C. English
*Attorney, Agent, or Firm*—Tarolli, Sundheim, Covell, Tummino & Szabo

[57] ABSTRACT

An air bag inflator (14) includes a pressure vessel (40), an initiator (42) and a filter (38). The pressure vessel (40) has a sealed chamber (44) containing inflation fluid under pressure, and includes a rupturable closure wall (100) which blocks the inflation fluid from exiting the chamber (44). The initiator (42) releases the inflation fluid to exit the chamber, and includes a casing (122) centered on an axis. The casing (122) contains pyrotechnic material which, when ignited, produces combustion products for rupturing the closure wall (100). The filter (38) is a sintered metal screen which filters the inflation fluid. The sintered metal screen (38) has an elongated tubular shape extending longitudinally over the casing (122) radially outward from the casing (122).

15 Claims, 3 Drawing Sheets

5,516,144

SIDE IMPACT AIR BAG INFLATOR

FIELD OF THE INVENTION

The present invention relates to an inflator for inflating an inflatable vehicle occupant restraint, such as an air bag, and particularly relates to an inflator for inflating an air bag in a vehicle upon the occurrence of a side impact collision.

BACKGROUND OF THE INVENTION

An inflatable vehicle occupant restraint, such as an air bag, is inflated in a vehicle upon the occurrence of a vehicle collision. The air bag is typically stored in an uninflated condition in an air bag module. The module may be mounted on any one of several different parts of the vehicle, such as the steering column or the instrument panel. When the vehicle experiences a collision, the air bag is inflated outward from the module and into the vehicle occupant compartment. The air bag then restrains movement of a vehicle occupant toward the part of the vehicle upon which the module is mounted.

If the air bag is intended to restrain a vehicle occupant upon the occurrence of a side impact collision, the module is mounted at the side of the vehicle. Specifically, the module is mounted in a position to direct the inflating air bag between the occupant and an adjacent door. The module may thus be mounted, for example, on the door, on an adjoining pillar, on the seat, or on the floor beside the seat.

SUMMARY OF THE INVENTION

In accordance with the present invention, an apparatus for inflating an inflatable vehicle occupant restraint comprises a pressure vessel means and an initiator means. The pressure vessel means defines a sealed chamber containing inflation fluid under pressure, and includes a rupturable closure wall which blocks the inflation fluid from exiting the chamber. The initiator means releases the inflation fluid to exit the chamber. The initiator means includes a casing centered on an axis. The casing contains pyrotechnic material which, when ignited, produces combustion products for rupturing the closure wall.

The apparatus further comprises filter means for filtering the inflation fluid. The filter means includes a sintered metal screen. The sintered metal screen has an elongated tubular shape, and extends longitudinally over the casing radially outward from the casing.

In a preferred embodiment of the present invention, the initiator casing has an elongated cylindrical shape which is centered on the axis. The casing and the sintered metal screen together define radially opposed boundaries of a fluid flow space which extends radially from the casing to the sintered metal screen along the entire length of the casing. The inflation fluid is released to flow through the fluid flow space when the closure wall is ruptured.

In the preferred embodiment of the present invention, the sintered metal screen further functions as a support means for supporting the initiator means in a position from which the casing directs the combustion products toward the closure wall. The sintered metal screen extends longitudinally from the pressure vessel means to the initiator means. An axially outer end portion of the sintered metal screen is crimped around a circular base portion of the initiator means. An axially inner end portion of the sintered metal screen is fixed to the pressure vessel means by a weld. The initiator means is thus supported relative to the pressure vessel means, and is spaced from the pressure vessel means, entirely by the sintered metal screen.

BRIEF DESCRIPTION OF THE DRAWINGS

Further features of the present invention will become apparent to those skilled in the art to which the present invention relates from reading the following description with reference to the accompanying drawings, in which.

DESCRIPTION OF A PREFERRED EMBODIMENT

Figure 1:
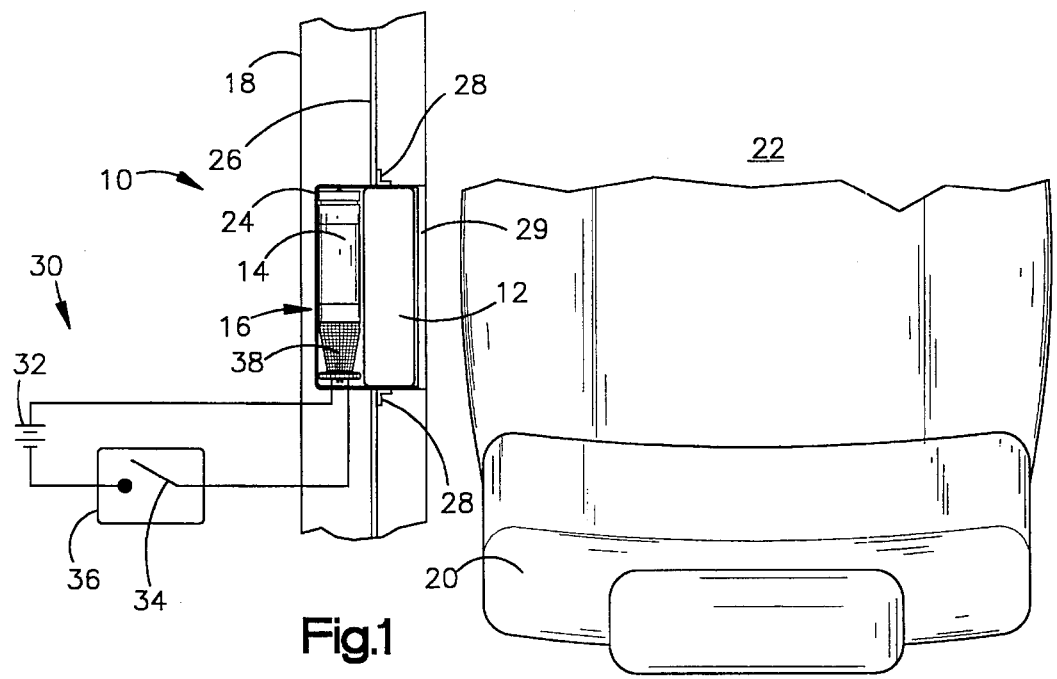
FIG. 1 is a schematic view showing parts of a vehicle and a vehicle occupant restraint apparatus comprising a preferred embodiment of the present invention.
Figure 2:
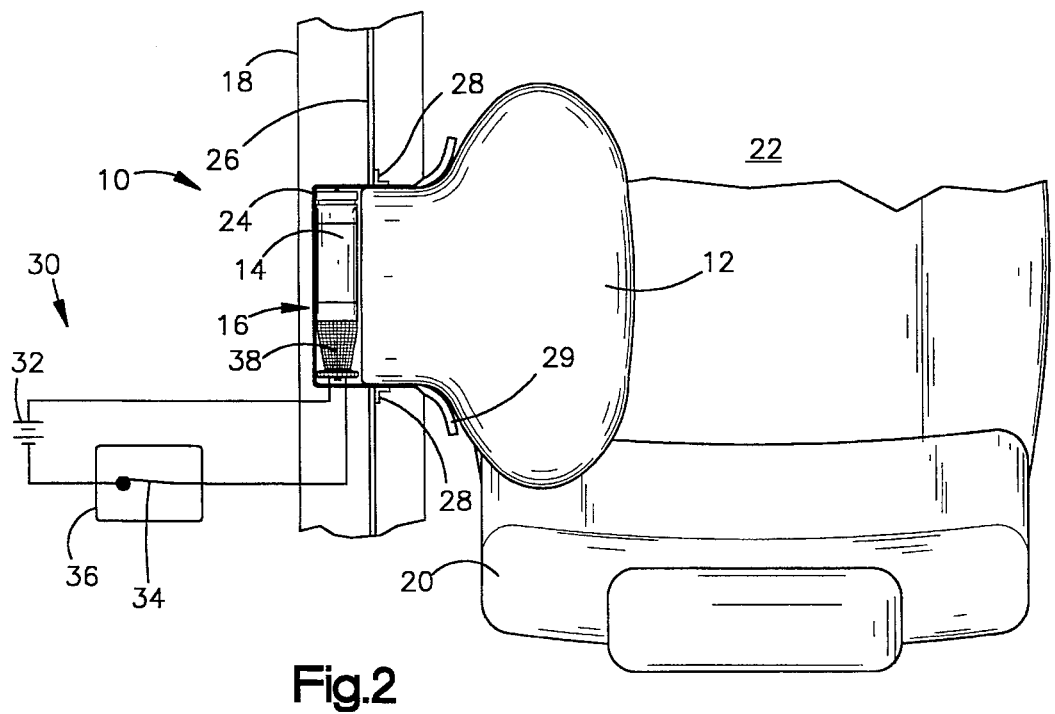
FIG. 2 is a schematic view showing the apparatus of FIG. 1 in an actuated condition.

A vehicle occupant restraint apparatus 10 comprising a preferred embodiment of the present invention is shown schematically in FIGS. 1 and 2. The apparatus 10 includes an inflatable vehicle occupant restraint 12, which is commonly referred to as an air bag, and an inflator 14 for inflating the air bag 12. The air bag 12 and the inflator 14 are parts of an air bag module 16 which is mounted on a vehicle door 18 adjacent to a seat 20 in the vehicle occupant compartment 22.

The module 16 includes a reaction canister 24 which contains the air bag 12 and the inflator 14. The reaction canister 24 is mounted on a structural panel 26 of the door 18 by welded brackets 28 or the like. A rupturable deployment door 29 conceals the air bag 12 from the vehicle occupant compartment 22. The deployment door 29 may be a part of the module 16 or a part of the door 18, and may comprise any suitable structure known in the art.

The inflator 14 is included in an electrical circuit 30. The circuit 30 further includes a power source 32, which is preferably the vehicle battery and/or a capacitor, and a normally open switch 34. The switch 34 is preferably part of a collision sensor 36 which senses a vehicle condition indicative of a collision for which inflation of the air bag 12 is desired to restrain an occupant of the seat 20. In the preferred embodiment of the present invention shown in the drawings, the air bag 12 is intended to restrain an occupant of the seat 20 upon the occurrence of a side impact collision, i.e., a collision in which an impact is directed against the vehicle in a direction transverse to the front-to-rear axis of the vehicle. Therefore, the collision-indicating condition that is sensed by the collision sensor 36 may comprise, for example, a predetermined amount of transverse vehicle acceleration and/or a predetermined amount of crushing of the door 18. The collision sensor 36 closes the switch 34 upon sensing such a collision-indicating condition. The inflator 14 is then actuated electrically.

When the inflator 14 is actuated, it emits a large volume of inflation fluid through a diffuser 38 at one end of the inflator 14. The reaction canister 24 directs the inflation fluid to flow from the diffuser 38 into the air bag 12 to inflate the air bag 12 from a stored, folded condition (FIG. 1) to an inflated condition (FIG. 2). As the inflation fluid begins to inflate the air bag 12, it moves the air bag 12 outwardly against the deployment door 29. A stress riser (not shown)

in the deployment door 29 ruptures under the stress induced by the increasing pressure of the inflation fluid flowing into the air bag 12. As the inflation fluid continues to inflate the air bag 12, it moves the air bag 12 outward past the ruptured deployment door 29 and into the vehicle occupant compartment 22, as shown in FIG. 2. The air bag 12 then extends into the vehicle occupant compartment 22 between the door 18 and an occupant of the seat 20 to restrain the occupant from forcefully striking the door 18 or other parts of the vehicle.

Figure 3:
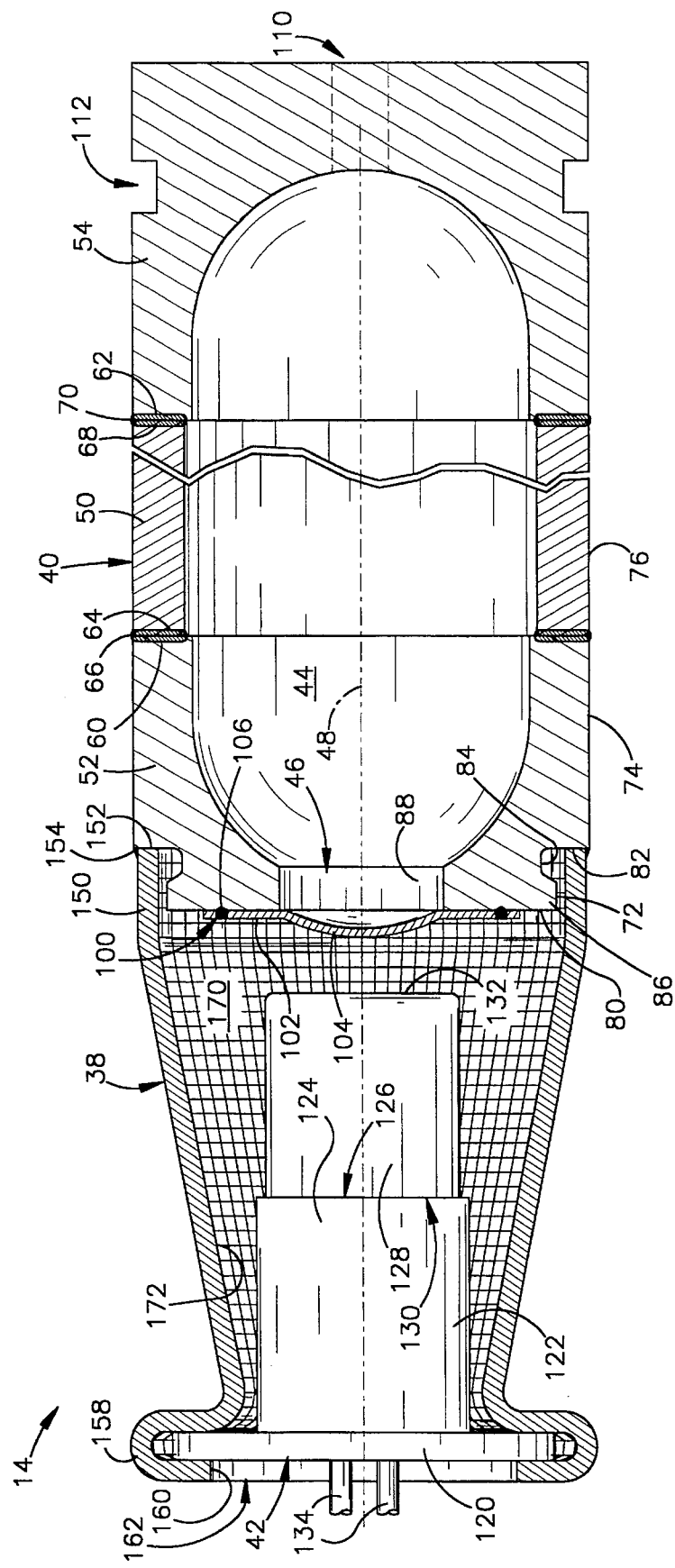
FIG. 3 is a side view, partly in section, showing parts of the apparatus of FIG. 1.

As shown in greater detail in FIG. 3, the inflator 14 includes a pressure vessel 40 and an initiator 42 in addition to the diffuser 38. The pressure vessel 40 has a sealed storage chamber 44 which contains the inflation fluid for inflating the air bag 12 (FIGS. 1 and 2). When the inflator 14 is actuated as described above, the initiator 42 opens the pressure vessel 40. The initiator 42 thus releases the inflation fluid to exit the storage chamber 44 through an outlet orifice 46. The inflation fluid then flows outward from the pressure vessel 40 to the diffuser 38, and further outward from the inflator 14 through the diffuser 38.

The pressure vessel 40 is an elongated cylindrical structure with a longitudinal central axis 48. In the preferred embodiment of the present invention shown in the drawings, the pressure vessel 40 has three major parts. The three major parts of the pressure vessel 40 include a tubular part 50 and a pair of cup-shaped parts 52 and 54 at opposite ends of the tubular part 50.

The tubular part 50 of the pressure vessel 40 has a pair of oppositely facing annular end surfaces 60 and 62. The first annular end surface 60 adjoins an opposed annular end surface 64 of the first cup-shaped part 52. A weld 66, which is preferably an inertia weld, extends circumferentially entirely around the abutting surfaces 60 and 64 to fasten and seal the tubular part 50 and the first cup-shaped part 52 to each other. The second annular end surface 62 of the tubular part 50 similarly abuts an opposed annular end surface 68 of the second cup-shaped part 54. A weld 70 like the weld 66 extends circumferentially entirely around the abutting surfaces 62 and 68 to fasten and seal the tubular part 50 and the second cup-shaped part 54 to each other.

The first cup-shaped part 52 of the pressure vessel 40 has a first cylindrical outer surface 72 and a second cylindrical outer surface 74, each of which is centered on the axis 48. The second cylindrical outer surface 74 is flush with a cylindrical outer surface 76 of the tubular part 50. The first cylindrical outer surface 72 is spaced radially inward, and axially outward, from the second cylindrical outer surface 74.

The first cup-shaped part 52 further has an annular end surface 80 and an annular shoulder surface 82, each of which faces axially outward from the pressure vessel 40. The end surface 80 extends radially inward from the first cylindrical outer surface 72. The shoulder surface 82 extends radially inward from the second cylindrical outer surface 74 at a location spaced axially inward from the end surface 80. Additionally, a recessed annular surface 84 with a concave contour extends axially between the first cylindrical outer surface 72 and the shoulder surface 82. The foregoing surfaces of the first cup-shaped part 52 together define a radially projecting rim 86 which extends circumferentially entirely around the axis 48. A short, cylindrical inner surface 88 of the first cup-shaped part 52 also is centered on the axis 48 and defines the outlet orifice 46.

The pressure vessel 40 further includes a closure wall 100. An annular peripheral portion 102 of the closure wall 100 is fixed and sealed to the outer end surface 80 of the first cup-shaped part 52 by a circumferentially continuous weld 106. A circular central portion 104 of the closure wall 100 extends diametrically across the axis 48, and has a concave contour facing axially toward the outlet orifice 46. The closure wall 100 thus defines, and closes, the axially outer end of the storage chamber 44.

The inflation fluid is contained in the storage chamber 44 at an elevated pressure, and may have any suitable composition known in the art. An inlet opening 110 is located at the center of the second cup-shaped part 54 of the pressure vessel 40. The inlet opening 110 is closed and sealed in a known manner when the storage chamber 44 has been filled with the inflation fluid at the elevated pressure. A groove 112 extends circumferentially around the second cup-shaped part 54. The groove 112 is designed for mounting of the pressure vessel 40 on a machine which fills the storage chamber 44 with the inflation fluid, as known in the art.

The initiator 42 has a radially extending circular base 120 and a smaller diameter cylindrical casing 122 centered on the axis 48. A first cylindrical wall portion 124 of the casing 122 defines the length and diameter of a first section 126 of the casing 122. A second cylindrical wall portion 128 of the casing 122 similarly defines the length and diameter of a second, slightly narrower section 130 of the casing 122. The second section 130 includes a circular inner end wall 132 of the casing 122.

The initiator 42 contains pyrotechnic materials (not shown) which are ignited in a known manner upon the passage of electric current through the initiator 42 between a pair of lead wires 134. A first pyrotechnic material, which is preferably $ZrKClO_4$, is contained in the first section 126 of the casing 122. A second pyrotechnic material, which is preferably $BKNO_3$, is contained in the second section 130 of the casing 122. Although an initiator like the initiator 42 is preferred, any other suitable initiator known in the art may be used as an alternative.

The diffuser 38 is an elongated tubular member which also is centered on the axis 48. In the preferred embodiment of the present invention, the diffuser 38 is formed of a sintered metal screen material which is drawn and crimped into the somewhat conical tubular shape shown in the drawings. The diffuser 38 thus has a porous structure through which the inflation fluid can flow radially outward from the inflator 14 around the entire circumference of the diffuser 38. Most preferably, the diffuser 38 is defined by a single piece of sintered stainless steel screen, such as the sintered stainless steel screen marketed by Michigan Dynamics, Inc. of Garden City, Mich. Although sintered metal screens may have laminated structures, the diffuser 38 shown in the drawings includes only a single layer of sintered metal screen.

Figure 4:
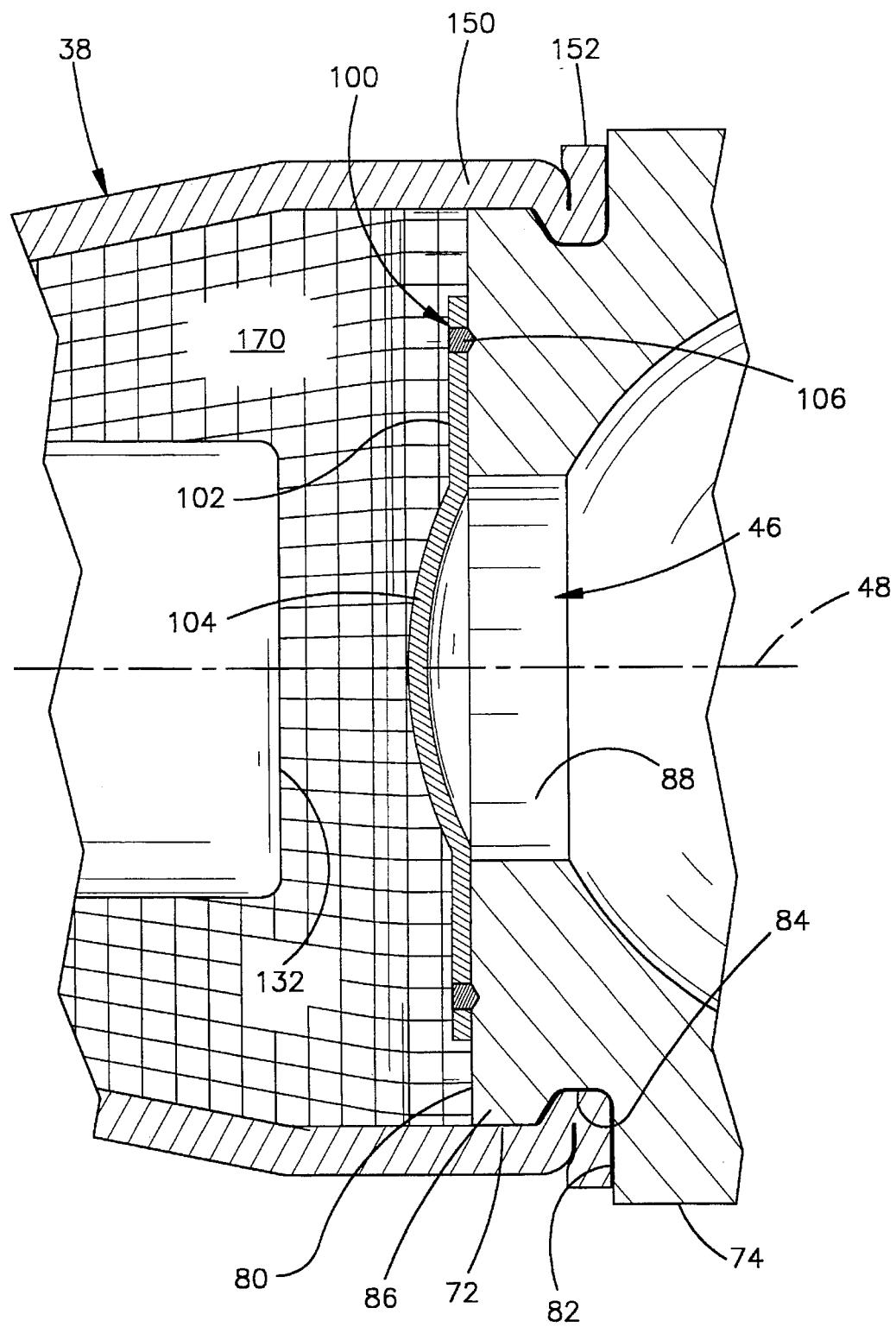
FIG. 4 is an enlarged partial view of the apparatus of FIG. 1 showing an alternative structural detail.

An axially inner end portion 150 of the diffuser 38 is mounted on the first cup-shaped part 52 of the pressure vessel 40. Specifically, the axially inner end portion 150 of the diffuser 38 extends concentrically over the first cylindrical outer surface 72 of the cup-shaped part 52, and has an annular edge surface 152 abutting the annular shoulder surface 82. A weld 154 extends circumferentially entirely around the abutting annular surfaces 152 and 82 to fix the diffuser 38 securely to the pressure vessel 40. Alternatively, the axially inner end portion 150 of the diffuser 38 can be crimped around the rim 86 on the pressure vessel 40, as shown in FIG. 4.

An axially outer end portion 158 of the diffuser 38 has an annular edge surface 160 which defines a circular opening 162 centered on the axis 48. The outer end portion 158 is crimped around the radially extending base 120 of the initiator 42 such that the diffuser 38 is rigidly connected to the initiator 42 at the base 120. The diffuser 38 thus supports the initiator 42, with the base 120 extending across the opening 160 to close the opening 160, and with the casing 122 projecting axially from the base 120 toward the pressure vessel 40. Importantly, the initiator 42 is thus supported relative to the pressure vessel 40, and is spaced from the pressure vessel 40, entirely by the sintered metal screen structure of the diffuser 38.

A fluid flow space 170 is defined within the inflator 14 at a location outside of the pressure vessel 40. The fluid flow space 170 extends axially between the pressure vessel 40 and the inner end wall 132 of the casing 122, and further extends axially over the entire length of the casing 122 from the inner end wall 132 to the circular base 120. The cylindrical wall portions 124 and 128 of the casing 122 define radially inner boundaries of the fluid flow space 170. The radially outer boundary of the fluid flow space 170 is defined by a surrounding inner surface 172 of the diffuser 38 which extends axially from the pressure vessel 40 to the base 120 of the initiator 42.

When the inflator 14 is actuated upon the occurrence of a vehicle collision, as described above, electric current is directed through the initiator 42 between the lead wires 134. The pyrotechnic materials in the casing 122 are then ignited and emit combustion products including heat and hot particles. The combustion products rupture the casing 122 and are spewed outward from the casing 122. Some of the combustion products move against and rupture the central portion 104 of the closure wall 100. The inflation fluid in the storage chamber 44 is thus released to flow outward from the pressure vessel 40 and through the fluid flow space 170 to the diffuser 38.

As the inflation fluid emerges from the pressure vessel 40, it is heated and expanded by the combustion products emitted from the initiator 42. This occurs primarily as the inflation fluid flows throughout the fluid flow space 170, and occurs to a lesser extent in the storage chamber 44 as the inflation fluid encounters the combustion products upon exiting the storage chamber 44. As a result, the inflation fluid flows outward through the diffuser 38 at a flow rate that is higher than it would be if the inflation fluid were not heated and expanded.

When the combustion products emitted from the initiator 42 mix with the inflation fluid to heat and expand the inflation fluid in the foregoing manner, the flow developed by the pressure of the inflation fluid carries some of the particulate combustion products outward against the diffuser 38. Pieces of the ruptured initiator casing 122, and possibly pieces of the ruptured closure wall 100, also are carried outward against the diffuser 38 by the flow of inflation fluid. However, the porosity of the sintered metal screen structure is such that the particulate combustion products and/or pieces of the ruptured parts of the inflator 14 are blocked from flowing through the diffuser 38 with the inflation fluid. The inflation fluid is thus filtered as it flows outward from the inflator 14 through the diffuser 38.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for inflating an inflatable vehicle occupant restraint, said apparatus comprising:

pressure vessel means for defining a sealed chamber containing inflation fluid under pressure, said pressure vessel means including a rupturable closure wall which blocks said inflation fluid from exiting said chamber;

initiator means for releasing said inflation fluid to exit said chamber, said initiator means including a casing containing pyrotechnic material which, when ignited, produces combustion products for rupturing said closure wall; and support means for supporting said initiator means in a position from which said casing directs said combustion products toward said closure wall, said support means including a sintered metal screen, said sintered metal screen having an elongated tubular shape and extending longitudinally from said pressure vessel means to said initiator means.

2. Apparatus as defined in claim 1 wherein said metal is stainless steel.

3. Apparatus as defined in claim 1 wherein said initiator means is spaced from said pressure vessel means entirely by said sintered metal screen.

4. Apparatus as defined in claim 1 wherein said sintered metal screen has a crimped portion which is crimped against said initiator means.

5. Apparatus as defined in claim 4 wherein said initiator means has a circular base from which said casing projects toward said closure wall, said crimped portion of said sintered metal screen being crimped around said base.

6. Apparatus as defined in claim 5 wherein said sintered metal screen has a portion which is fixed to said pressure vessel means by a weld.

7. Apparatus as defined in claim 1 wherein said sintered metal screen has a longitudinal central axis and an annular edge surface defining a circular opening centered on said axis, said initiator means having a circular base extending across said opening to close said opening.

8. Apparatus as defined in claim 7 wherein said casing is cylindrical and extends coaxially within said sintered metal screen from said base toward said closure wall, said casing and said sintered metal screen together defining radially opposed boundaries of a fluid flow space which extends radially from said casing to said sintered metal screen along the entire length of said casing, said inflation fluid being released to flow through said fluid flow space when said closure wall is ruptured.

9. Apparatus as defined in claim 1 further comprising an inflatable vehicle occupant restraint, reaction canister means for directing said inflation fluid from said sintered metal screen into said restraint to inflate said restraint, a vehicle seat adjacent to a vehicle door, and means for supporting said restraint at a location from which said restraint moves into a space between said door and said seat upon inflation of said restraint.

10. Apparatus for inflating an inflatable vehicle occupant restraint, said apparatus comprising:

pressure vessel means for defining a sealed chamber containing inflation fluid under pressure, said pressure vessel means including a rupturable closure wall which blocks said inflation fluid from exiting said chamber;

initiator means for releasing said inflation fluid to exit said chamber, said initiator means including a casing centered on an axis, said casing containing pyrotechnic material which, when ignited, produces combustion products for rupturing said closure wall; and filter means for filtering said inflation fluid, said filter means including a sintered metal screen, said sintered metal screen having an elongated tubular shape and extending longitudinally over said casing radially outward from said casing;

said sintered metal screen having a crimped portion which is crimped against said initiator means.

11. Apparatus as defined in claim 10 wherein said initiator means has a circular base from which said casing projects toward said closure wall, said crimped portion of said sintered metal screen being crimped around said base.

12. Apparatus as defined in claim 11 wherein said sintered metal screen extends longitudinally from said pressure vessel means to said base.

13. Apparatus for inflating an inflatable vehicle occupant restraint, said apparatus comprising:

pressure vessel means for defining a sealed chamber containing inflation fluid under pressure, said pressure vessel means including a rupturable closure wall which blocks said inflation fluid from exiting said chamber;

initiator means for releasing said inflation fluid to exit said chamber, said initiator means including a casing centered on an axis, said casing containing pyrotechnic material which, when ignited, produces combustion products for rupturing said closure wall; and filter means for filtering said inflation fluid, said filter means including a sintered metal screen, said sintered metal screen having an elongated tubular shape and extending longitudinally over said casing radially outward from said casing;

said sintered metal screen supporting said initiator means in a position from which said casing directs said combustion products toward said closure wall.

14. Apparatus as defined in claim 13 wherein said initiator means is entirely spaced from said pressure vessel means by said sintered metal screen.

15. Apparatus as defined in claim 13 further comprising an inflatable vehicle occupant restraint, reaction canister means for directing said inflation fluid from said sintered metal screen into said restraint to inflate said restraint, a vehicle seat adjacent to a vehicle door, and means for supporting said restraint at a location from which said restraint moves into a space between said door and said seat upon inflation of said restraint.

\* \* \* \* \*